Figure 1:
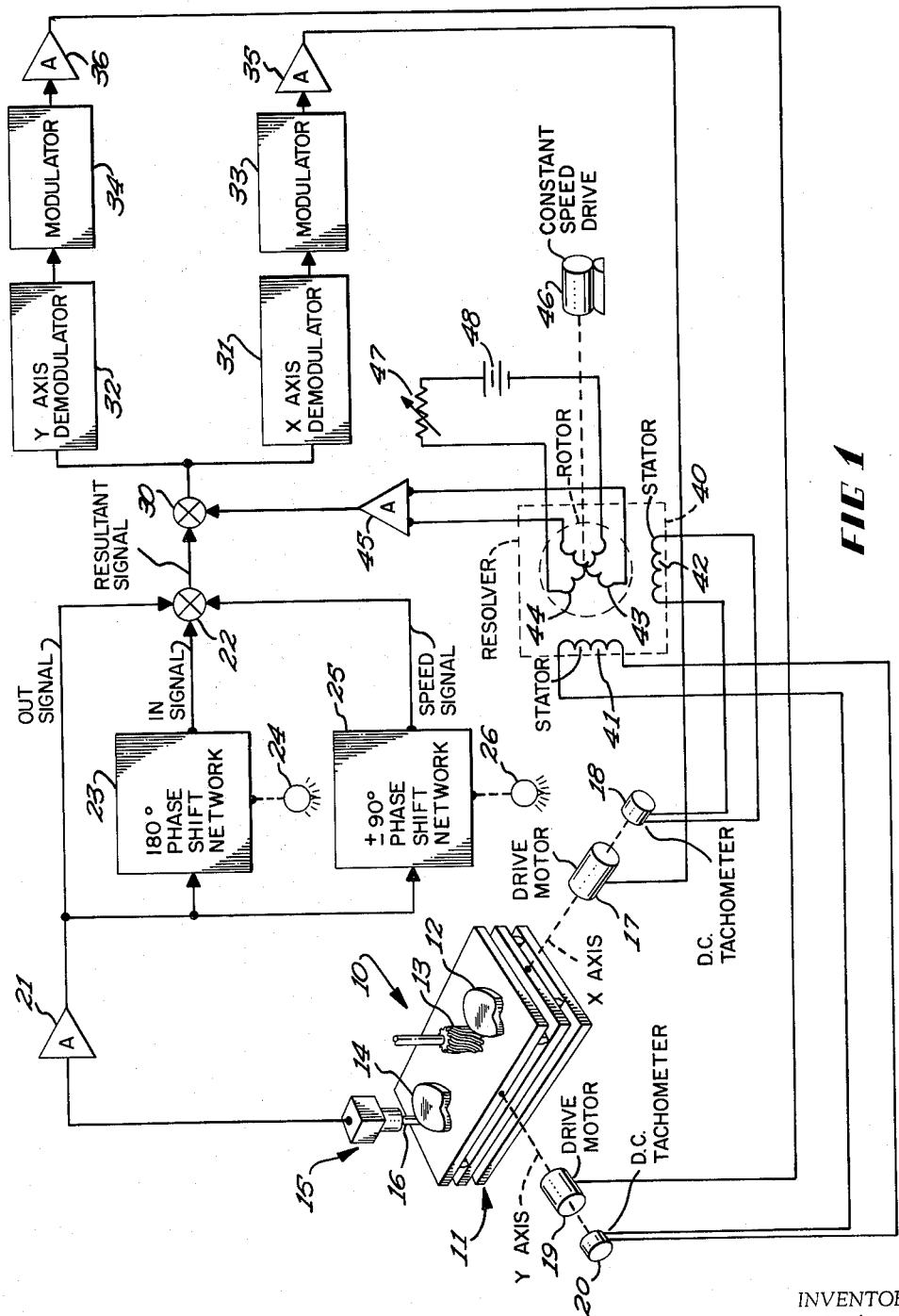

INVENTOR.
RICHARD K. HEISER

July 5, 1966  R. K. HEISER  3,259,819
CONTROL APPARATUS UTILIZING ELECTROMAGNETIC RESOLVER
Filed Oct. 28, 1963  2 Sheets-Sheet 2

INVENTOR.
RICHARD K. HEISER
BY
ATTORNEY 3,259,819
CONTROL APPARATUS UTILIZING ELECTRO-
MAGNETIC RESOLVER
Richard K. Heiser, Minneapolis, Minn., assignor to
Honeywell Inc., a corporation of Delaware
Filed Oct. 28, 1963, Ser. No. 319,155
7 Claims. (Cl. 318—19)

My invention is concerned with an improved control apparatus and particularly with an improved control apparatus utilizing an electromagnetic resolver to effect the vector summation of D.C. voltage to provide an output A.C. voltage whose magnitude and phase is the resolved resultant of the D.C. voltages.

In a preferred embodiment, my invention makes use of a resolver, a rotary electric machine, having a pair of quadrature oriented input windings and an output winding. Means is provided to cause relative rotation between the input and the output winding. Preferably, this rotation is achieved by a synchronous motor providing constant speed of relative rotation. A pair of D.C. voltages, each of which is indicative of a given condition, are utilized, one of the voltages being applied to one of the input windings while the other voltage is applied to the other input winding. Thus, a magnetic field is established having a direction and a magnitude as determined by the magnitude relationship of the two separate D.C. voltages. Rotation of the output winding, relative to the quadrature oriented input windings, causes an A.C. voltage to be generated therein whose phase and magnitude is determined by the direction and magnitude of the above mentioned magnetic field.

As a further feature of my invention, I provide a further winding which is oriented in quadrature relation to the above mentioned output winding and is connected to a source of D.C. voltage to generate a magnetic field which is used to cancel out the effect of residual magnetism which may be found in the resolver.

As a further feature of my invention, I utilize the above described structure in combination with a tracer control apparatus, wherein the tracer control apparatus consists of a tracer head associated with a templet, and wherein the tracer head is connected to control electrical apparatus to provide a command A.C. signal whose quadrature components are indicative of a desired relative movement to be achieved between the tracer and the templet. As a specific embodiment, the relative movement between the tracer and the templet is achieved along coordinate axes of movement which are perpendicular to each other and thus quadrature components of the resultant command A.C. signal are referenced to the axes of relative movement of the tracer and templet to give a pair of signals, one for each axis of movement.

In the machine tool apparatus the means to produce the relative movement includes a separate drive means for each of the two quadrature axes and each of these separate drive means are constructed and arranged to provide separate and independent D.C. output voltages which are indicative of the actual movement which is achieved along each of the two axes. It is these two D.C. voltages which are connected to the input windings of the above described resolver. The output winding of the resolver may then be selectively utilized to indicate the speed of movement of the tracer in a direction tangential to the point of engagement with the templet, or may be utilized to be summed with the command signal as a stabilization voltage to thereby stabilize operation of the tracer control apparatus.

Figure 2:
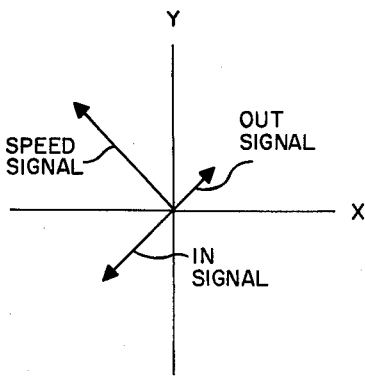
Figure 3:
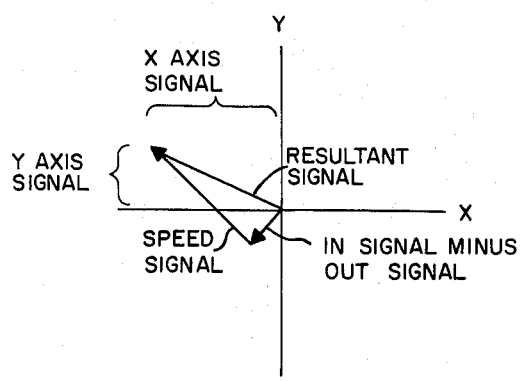
Figure 4:
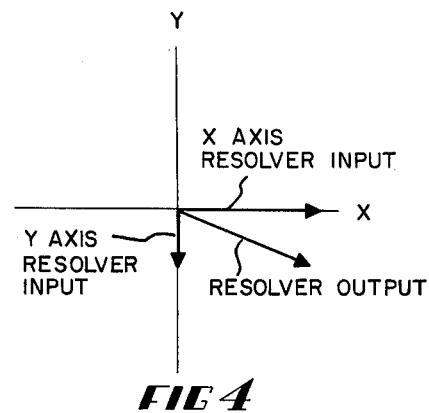
Figure 5:
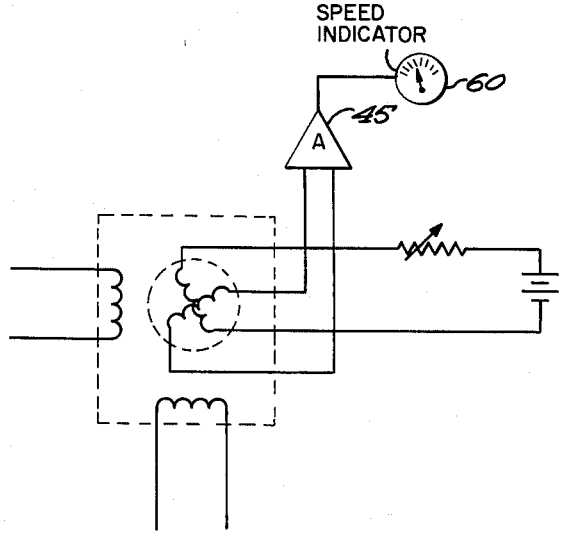

My invention will be apparent to those skilled in the art upon reference to the following specification, claims, and drawings, of which:

FIGURE 1 is a schematic representation of a tracer control apparatus utilizing my invention, FIGURE 2 is a vector diagram showing the three basic A.C. signals utilized in the apparatus of FIGURE 1, FIGURE 3 is a showing of the summation of the three signals of FIGURE 2 to provide the quadrature component portions of a resultant A.C. command signal, FIGURE 4 is a vector diagram showing the two quadrature resolver D.C. inputs and the resolver A.C. output, and FIGURE 5 is a schematic representation of a portion of FIGURE 1, wherein the structure is modified to provide an indication of speed of trace, rather than to provide a stabilizing feedback signal as in FIGURE 1.

Referring to FIGURE 1, reference numeral 10 designates generally a machine tool which is to be controlled. This machine tool includes a table 11, having mounted thereon a work piece 12 with a tool 13 engaging the work piece, and a templet 14 to be traced with a tracer head 15 having a stylus 16 engaging the templet. The table 11 is constructed and arranged for movement along a pair of mutually perpendicular axes, identified by the legend X axis and Y axis respectively. Movement along the X axis is controlled by a drive motor 17 connected to drive a D.C. tachometer 18. Movement along the Y axis is controlled by a motor 19 connected to drive a D.C. tachometer 20.

Apparatus of this general type is well known in the art and it is intended that motors 17 and 19 be so energized as to produce movement along the X and Y axes to cause stylus 16 to move in a direction tangential to the point of engagement of the stylus with templet 14. For example, should stylus 16 be engaging a surface of templet 14 which is parallel to the Y axis, then only drive motor 19 is energized. Likewise, should stylus 16 be engaging a surface of templet 14 which is parallel to the X axis, then only drive motor 17 is energized. For surfaces of templet 14 which are contoured to have a direction between these two extremes, simultaneous energization of motors 17 and 19 produces the required speed of movement along the X and Y axes to cause stylus 16 to trace and to move tangential to the portion of the templet 14 then being engaged. In this manner, stylus 16 is "steered" around templet 14, either in a clockwise or counter-clockwise direction. In a well known manner, tool 13 engages and cuts work piece 12 to the contour of templet 14.

The apparatus of tracer head 15 is constructed and arranged to provide a basic A.C. control signal to the input of an amplifier 21, this amplifier amplifying the control signal and presenting this control signal as an A.C. "out" signal to the first input of a summation point 22. This out signal is likewise applied to a 180° phase shifting network 23 whose output provides an A.C. "in" signal to another input of the summation point 22. This in signal has a magnitude which is controlled by a control knob 24 to select a required deflection of stylus 16 to thus generate an out signal which is equal and opposite in magnitude to the selected magnitude of the in signal. The in and out signals, both A.C. signals, are displaced 180° and thus, when stylus 16 is deflected to the extent determined by the magnitude of the in signal, the in signal and the out signal are equal and opposite.

A + or −90° phase shift network 25 is provided with the input of this network also controlled by the out signal. The output of network 25 is an A.C. "speed" signal and this signal is likewise applied to an input of the summation point 22. The magnitude of the speed signal is controlled by adjustment of a knob 26. The phase of this signal is shifted + or −90°, depending upon the desired direction of trace around templet 14.

Referring to FIGURE 2, this figure discloses an X and Y coordinate system which is the X and Y axes coordinate system of movement of machine tool 10 of FIG- URE 1. For purposes fo explanation, an out signal has been designated and an in signal of greater magnitude is shown as displaced 180° from the out signal. For the conditions as shown in FIGURE 2, which conditions are exaggerated, the deflection of stylus 16 is less than that which has been commanded by adjustment of knob 24, and thus the out signal is of a magnitude which is smaller than the in signal. The speed signal is displaced 90° from the out signal and is of a magnitude as controlled by the adjustment of knob 26 of FIGURE 1.

In FIGURE 3, I have shown the vector summation of the out signal, the in signal, and the speed signal to produce a resultant or command A.C. signal. This resultant signal is applied to an input of a summation point 30, shown in FIGURE 1. The resultant A.C. signal has a phase and a magnitude as determined by the vectors summation of the out signal, the in signal, and the speed signal. Also, as shown in FIGURE 3, the resultant signal can be resolved into an X axis signal and a Y axis signal, these two signals being the quadrature components of the resultant signal.

Referring again to FIGURE 1, the resultant signal is applied to the input of an X axis demodulator 31 and to the input of a Y axis demodulator 32. Demodulators 31 and 32 are constructed and arranged to provide D.C. output signals of magnitudes directly related to the X axis signal and the Y axis signal shown in FIGURE 3. That is, the output of the X axis demodulator and the output of the Y axis demodulator are respectively the X and Y quadrature components of the resultant A.C. signal which is applied to summation point 30.

The output of the demodulators, a D.C. signal, is then applied to the input of modulators 33 and 34, where these signals are converted to A.C. signals having magnitudes corresponding to the magnitudes of the respective D.C. voltages. These A.C. signals are then amplified by amplifiers 35 and 36 and are then connected to control the direction and speed of rotation of the drive motors 17 and 19 respectively.

Thus far, I have described a transient condition which momentarily exists when stylus 16 is not deflected to the extent as commanded by the then existing adjustment of knob 24. The energization of drive motors 17 and 19 is effective to produce rectilinear motion of table 11 along the X and Y axes to produce the desired deflection of stylus 16 and thus cause the out signal to be equal and opposite to the in signal. Thus, the condition which normally controls the X and Y axes demodulators 31 and 32 is a signal consisting of only a speed signal and this speed signal then becomes the resultant signal of FIGURE 3 to be resolved into the Y axis and X axis components to control movement along the X and Y axis for table 11, causing stylus 16 to move tangential to the surface of the templet 14 at the speed selected by control knob 26.

I have chosen to show a basic tracer control apparatus, recognizing that many other features, for example over-deflection output, may be provided.

For the apparatus as disclosed in FIGURE 1, I provide a unique resolver configuration to provide a stabilizing feedback voltage to a second input of summation point 30. Reference numeral 40 designates generally a resolver having a stator including first and second quadrature oriented input windings 41 and 42. A rotor is provided having a pair of quadrature oriented windings 43 and 44. Winding 43 can be considered to be an output winding which rotates relative to the quadrature oriented input windings 41 and 42. The A.C. output signal generated within output winding 43 is connected to the input of an ampulifier 45 whose A.C. output is connected to summation point 30. Reference numeral 46 designates a constant speed drive which may be in the form of a synchrouous motor providing a substantially constant speed of rotation of windings 44 and 43 relative to windings 41 and 42.

Wind 44 is connected through a variable impedance device 47 to a source of D.C. voltage to provide a magnetic field within the rotor to cancel the effect of residual magnetism which may exist in the stator of resolver 40.

The input windings of resolver 40 are associated in a quadrature orientation and the D.C. voltages applied to these windings from tachometers 18 and 20 generate a magnetic field having a direction and magnitude which is in effect the result of two individual magnetic fields which are quadrature related and which are each individually generated by the D.C. voltages of the tachometers. Thus, this magnetic field bears a definite relationship to the movement of the table 11 along the X and Y axes and to the movement of stylus 16 along the contour of the templet 14. Relative rotation between output winding 43 and input windings 41 and 42 causes an A.C. signal to be generated in output winding 43. This A.C. signal is of a phase and of a magnitude which is indicative of the direction and speed of trace respectively of stylus 16 along the contour of templet 14, as related to the X and Y coordinate system established by the X and Y axes of movement of table 11. The resolved quadrature components of the A.C. signal generated within output winding 43 is respectively indicative of actual movement of the table along the respective X and Y axes.

This actual movement of the table may be compared to the required movement which is commanded by the resultant A.C. signal. In order to achieve this comparison the A.C. signal applied from the output of amplifier 45 to summation point 30 generally opposes the resultant signal applied from summation point 22. When movement of the machine tool is as desired, these voltages are equal and opposite. Thus, the output of amplifier 45 acts to stabilize the control of the machine tool along its two axes of movement.

As has been mentioned, the magnitude of the A.C. signal present at the output of amplifier 45 is indicative of the tangential speed of trace of stylus 16 relative to templet 14. In FIGURE 4, I show a modification whereby the output of amplifier 45 is connected to energize an indicator 60, this indicator being calibrated in terms of speed of trace.

From the above description it can be seen that I have provided a unique apparatus to provide the vector summation of two independent D.C. signals, resolving these D.C. signals into an output A.C. signal. I also provide a unique manner to applying this principle to a tracer control apparatus to stabilize the operation of the apparatus, or to provide indication of the speed of trace of the apparatus.

Other modifications of my invention will be apparent to those skilled in the art and it is thus intended that the scope of my invention be limited only to the scope of the appended claims.

I claim as my invention:

1. Resolver apparatus, comprising;
a pair of drive means connected to produce rectilinear movement along quadrature axis,
command means to provide an A.C. output command signal whose quadrature components are indicative of a command drive speed for each of said drive means along each of said quadrature axis,
means controlled by said A.C. command signal connected in controlling relation to said drive means to produce said command drive speed thereof
further means associated with each of said drive means to provide a pair of D.C. output signals indicative of the actual drive speed of each of said drive means,
a resolver having a pair of quadrature related input windings and an output winding,
means producing relative rotation between said input windings and said output winding,
means connecting said input windings to said further means to apply one of said D.C. output signals to each of said input windings, to thereby cause an A.C.

reference signal to be generated in said output winding whose quadrature components are indicative of the actual drive speed of each of said drive means.

2. In combination,
a pair of condition changing means to be individually controlled,
command means providing an A.C. output command signal whose quadrature components are indicative of the desired selective control of each of said pair of condition changing means,
electrical network means having an input connected to be controlled by said command signal and having a pair of outputs, each output having an output signal indicative of the individual quadrature components of said command signal,
means connecting each of said pair of outputs to one of said condition changing means, to thereby control the same in accordance with an individual quadrature component of said command signal,
first and second means, each of which is associated with a different one of said condition changing means to provide a first and a second D.C. signal indicative of the control of said condition changing means which is produced by said command signal,
a resolver having a pair of quadrature related input windings and an output winding, which rotates relative to said input windings,
means connecting a different one of said first and second D.C. signals to each of said input windings to thereby cause an A.C. reference signal to be generated in said output winding, the quadrature components of said reference signal being indicative of the control of said condition changing means,
and means connecting said A.C. reference signal to the input of said network means in opposition to said command signal.

3. In combination,
electrical means providing a pair of D.C. output voltages, the magnitude of each of said output voltages, the magnitude of each of said output voltages being indicative of a given condition,
a resolver having a pair of quadrature oriented input windings and an output winding,
means connecting the outputs of said electrical means to respective ones of said input windings,
means connected to produce relative rotation between said input and output windings at a substantially uniform speed,
and means connected to be controlled by the resultant A.C. voltage generated in said output winding, the quadrature components of said A.C. voltage being indicative of said output voltages.

4. In combination,
electrical means providing a first and a second D.C. output voltage, the magnitude of each of said output voltages being indicative of a given condition,
an electric machine having a rotor including a pair of quadrature oriented windings and having a stator including a pair of quadrature oriented windings,
means connected to rotate said rotor,
means connecting said first and second D.C. output voltages to one of said pair of windings to establish a magnetic field whose direction relative to the quadrature orientation of the windings is established by the relative magnitudes of said first and second D.C. output voltages,
means connected to be controlled by the resultant A.C. voltage generated in one winding of the other pair of windings, the quadrature components of said A.C. voltage being indicative of said output voltages,
and means connecting the other winding of said other pair of windings to a source of D.C. voltage to minimize the effect of a residual magnetic field of said electric machine.

5. In combination with a tracer control apparatus adapted to control a machine tool having a working tool and a work piece arranged for relative movement along quadrature axis, in which a tracer engages a template and are like-wise arranged for such movement, and in which electrical means is controlled by the tracer to produce an A.C. signal whose quadrature components are effective to control movement along the individual quadrature axis, the improvement comprising;
first and second means each of which is associated with a different one of the quadrature axis to provide a first and a second D.C. output signal, the magnitudes of which are indicative of the movement along the individual quadrature axis,
an electric machine having a pair of quadrature oriented input windings rotating relative to an output winding,
and means connecting said first and second means each to a different one of said input windings to produce a resultant magnetic field to be cut by said output winding, and to thereby generate an A.C. reference signal in said output winding, the quadrature components of said reference signal being indicative of the movement along the individual quadrature axis and the phase and magnitude of said reference signal being indicative of the direction and speed of tangential movement of the tracer relative to the template.

6. In a control apparatus for use with a machine tool having a template mounted for relative quadrature rectilinear motion along a first and a second mutually perpendicular axis with respect to a tracer, wherein electrical means is provided to be controlled by the tracer and to control such quadrature motion from an A.C. command signal whose phase is indicative of the desired instantaneous direction of relative movement and whose magnitude is indicative of the desired instantaneous speed of movement, the improvement comprising;
a first and a second drive means, each of which is effective to individually produce relative movement along the first and the second quadrature axes respectively,
electrical means having an input connected to be controlled by the A.C. command signal and to demodulate the same to produce a first and a second individual output control signal indicative of the desired relative movement along said first and second quadrature axis respectively,
means connecting the first and second output signals of said electrical means in controlling relation to said first and second drive means respectively to produce relative movement along the quadrature axes,
first and second D.C. generator means connected to said first and second drive means respectively to provide first and second D.C. reference voltages indicative of the actual movement along said first and second quadrature axis,
a resolver having an output winding and first and second quadrature oriented input windings,
means connecting said first and second generator means to said first and second input windings respectively to thus cause a magnetic field to be established in a direction which is related to said quadrature oriented windings as the direction of relative movement is related to the quadrature axis of the machine tool,
means connected to produce rotation of said output winding relative to said input windings to provide an A.C. reference voltage in said output winding as determined by said magnetic field,
and means connecting said A.C. reference voltage to the input of said electrical means as a stabilizing signal.

7. In a control apparatus for use with a machine tool having a template mounted for quadrature rectilinear motion along a first and a second mutually perpendicular axis with respect to a tracer, wherein electrical means is provided to be controlled by the tracer and to control such quadrature motion from the A.C. command signal whose phase is indicative of the desired instantaneous direction of relative movement and whose magnitude is indicative of the desired instantaneous speed of movement, the improvement comprising;

- a first and a second drive means, each of which is effective to individually produce relative movement along the first and the second quadrature axes respectively,
- electrical means having an input connected to be controlled by the A.C. command signal and to demodulate the same to produce a first and a second individual output control signal indicative of the desired relative movement along said first and second quadrature axis respectively,
- means connecting the first and second output signals of said electrical means in controlling relation to said first and second drive means respectively to produce relative movement along the quadrature axes,
- first and second D.C. generator means connected to said first and second drive means respectively to provide first and second D.C. reference voltages indicative of the actual movement along said first and second quadrature axis,
- a resolver having an output winding and first and second quadrature oriented input windings,
- means connecting said first and second generator means to said first and second input windings respectively to thus cause a magnetic field to be established in a direction which is related to said quadrature oriented windings as the direction of relative movement is related to the quadrature axis of the machine tool,
- means connected to produce rotation of said output winding relative to said input windings to provide an A.C. reference voltage in said output winding as determined by said magnetic field,
- and means connecting said A.C. reference voltage to indicator means to indicate the speed of movement.

No references cited.

JOHN F. COUCH, *Primary Examiner.*